US008411959B2

(12) United States Patent
Chae et al.

(10) Patent No.: US 8,411,959 B2
(45) Date of Patent: Apr. 2, 2013

(54) EXTRACTION METHOD OF AN INTEREST REGION FOR MULTIMEDIA MOBILE USERS

(75) Inventors: Kyung-Ho Chae, Seoul (KR);
Yong-Deok Kim, Seoul (KR);
Young-Hun Joo, Yongin-si (KR);
Kwang-Pyo Choi, Anyang-si (KR);
Yun-Je Oh, Yongin-si (KR); Chang-Ick Kim, Daejeon (KR); Won-Jun Kim, Seoul (KR)

(73) Assignees: Samsung Electronics Co., Ltd., Suwon-si (KR); Korean Advanced Institute of Science & Technology, Daejeon (KR)

( * ) Notice: Subject to any disclaimer, the term of this patent is extended or adjusted under 35 U.S.C. 154(b) by 668 days.

(21) Appl. No.: 12/528,367
(22) PCT Filed: Feb. 22, 2008
(86) PCT No.: PCT/KR2008/001061
§ 371 (c)(1),
(2), (4) Date: Feb. 19, 2010
(87) PCT Pub. No.: WO2008/103010
PCT Pub. Date: Aug. 28, 2008

(65) Prior Publication Data
US 2010/0150451 A1   Jun. 17, 2010

(30) Foreign Application Priority Data
Feb. 22, 2007   (KR) ........................ 10-2007-0017910

(51) Int. Cl.
G06K 9/48   (2006.01)
(52) U.S. Cl. ...................................... 382/190; 382/199
(58) Field of Classification Search .................. 382/100, 382/113, 276, 199, 190; 356/300, 301, 73; 345/156, 2.1, 1.1, 581, 589; 700/83, 17, 700/108, 73, 11, 95; 348/14.01, E13.016, 348/E13.014, E13.001, E13.002, E13.003, 348/E13.004; 725/10; 705/7.29, 729; 707/E17.109, 707/999.102, E17.082, E17.111, E17.018; 704/241; 202/269, 906, 258.5
See application file for complete search history.

(56) References Cited

U.S. PATENT DOCUMENTS
6,968,502 B1   11/2005   Kubomura et al.
7,013,920 B2 *   3/2006   Knecht et al. ............ 137/625.65
(Continued)

FOREIGN PATENT DOCUMENTS
KR   10-2001-0056157 A   7/2001
KR   10-2003-0029353 A   4/2003
(Continued)

OTHER PUBLICATIONS

Communication dated Sep. 12, 2008, issued by the Korean Intellectual Property Office in counterpart Korean Application No. 10-2007-0017910.

(Continued)

Primary Examiner — Sheela Chawan
(74) Attorney, Agent, or Firm — Sughrue Mion, PLLC

(57) ABSTRACT

Disclosed is a method for extracting a region-of-interest of a user in a multimedia mobile terminal. The method includes: setting a search region in an input picture input to the multimedia mobile terminal on a screen picture-to-screen picture basis, and extracting a group of boundary of a region-of-interest based on a brightness difference between the set search region and an environment around the set search region; determining boundary coordinates of the region-of-interest through learning during a predetermined frame among the extracted group of boundary coordinate candidates; and enlarging the region-of-interest having the determined boundary coordinates, and displaying the enlarged region-of-interest. As a result, a region the user is most interested in or pays more attention to than other regions on a screen is automatically extracted. Accordingly, it is possible for users to view pictures in such an efficient manner as to provide the users with an even better experience and understanding during viewing.

7 Claims, 5 Drawing Sheets

U.S. PATENT DOCUMENTS

| | | | | |
|---|---|---|---|---|
| 7,432,984 B2* | 10/2008 | Oh | | 348/578 |
| 2003/0028451 A1* | 2/2003 | Ananian | | 705/27 |
| 2003/0067983 A1 | 4/2003 | Lee et al. | | |
| 2005/0151884 A1 | 7/2005 | Oh | | |
| 2006/0045381 A1* | 3/2006 | Matsuo et al. | | 382/276 |
| 2006/0061602 A1 | 3/2006 | Schmouker et al. | | |
| 2006/0093998 A1* | 5/2006 | Vertegaal | | 434/236 |

FOREIGN PATENT DOCUMENTS

| KR | 10-2005-0073016 A | 7/2005 |
|---|---|---|
| KR | 10-2007-0077600 A | 7/2007 |

OTHER PUBLICATIONS

Knoche, Hendrik et al., "Can Small Be Beautiful? Assessing Image Resolution Requirements for Mobile TV", MM '05, Nov. 6-11, 2005, Singapore, 10 pages.

Utsumi, Okihisa et al., "An Object Detection Method for Describing Soccer Games from Video", Aug. 2002, 4 pages.

Yoon, Ho-Sub et al., "A Soccer Image Sequence Mosaicking and Analysis Method Using Line and Advertisement Board Detection", ETRI Journal, vol. 24, No. 6, Dec. 2002, pp. 443-454.

* cited by examiner

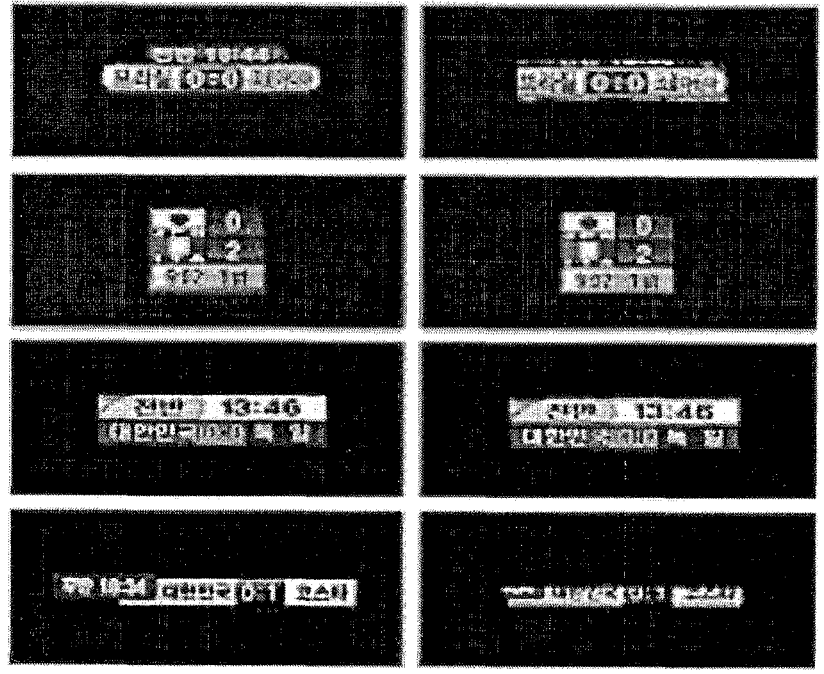

$$\text{RECALL} = \frac{\text{THE NUMBER OF PIXELS BELONGING TO AN ACTUAL SCORE REGION AMONG EXTRACTED SCORE REGIONS}}{\text{THE NUMBER OF PIXELS BELONGING TO AN ACTUAL REGION}} \times 100\%$$

AND $$\text{PRECISION} = \frac{\text{THE NUMBER OF PIXELS BELONGING TO AN ACTUAL SCORE REGION AMONG EXTRACTED SCORE REGIONS}}{\text{THE NUMBER OF ALL PIXELS BELONGING TO AN EXTRACTED REGION}} \times 100\%$$

FIG.7

EXTRACTION METHOD OF AN INTEREST REGION FOR MULTIMEDIA MOBILE USERS

TECHNICAL FIELD

The present invention relates to a method for extracting a region-of-interest for a user of a multimedia mobile terminal, which automatically extracts a region the user is most interested in or pays more attention to than other regions on a screen, enlarges the extracted region-of-interest, and then displays the enlarged region-of-interest, whenever the user desires to view the region-of-interest.

BACKGROUND ART

Recently, with the rapid development of multimedia signal processing and transmission technology and the advent of new types of mobile TV services, such as Digital Video Broadcasting-Handheld (DVB-H), Digital Multimedia Broadcasting (DMB), etc., popularity of viewing a video on a small Liquid Crystal Display (LCD) panel has increased. FIG. 1 illustrates the state of receiving and displaying a soccer game broadcast in a DMB phone. Mainly due to costs, most of the services provide an existing screen picture for mobile broadcasting only in a reduced size.

According to an experiment which has been conducted by Knoche and others in order to measure conditions (such as the number of pixels, a bit rate, etc.) of a picture having a reduced size suitable to be displayed in a mobile terminal, it is noted that a direct reduction of a picture for display in a small-sized terminal brings loss to a detailed part in terms of vision, as described in "H. Knoche, J. D. McCarthy, and M. A. Sasse, Can Small Be Beautiful?: Assessing Image Resolution Requirements for Mobile TV, in MULTIMEDIA "05: Proceeding of the 13th annual ACM international conference on Multimedia, pp. 829-838, ACM Press, (New York, N.Y., USA), 2005."

As described above, the loss as described above is most serious when the contents of a picture is field sports, especially, a soccer video, and becomes less serious in an order of music videos, news, and comic videos. Accordingly, in the case of a video including particular contents, there is a need for developing intelligent-type display technology which enables each viewer of the mobile terminal to view a screen picture in which only a Region-Of-Interest (ROI) is enlarged.

Herein, the ROI refers to a region the user is most interested in or pays more attention to than other regions on a screen. The ROI is utilized for situation perception contents adaptation, transcoding, intelligent-type information memagement, etc. Also, appointment of an ROI can be the first step for meaningfully analyzing a video scene, and thus it can be said that the appointment thereof is also very important art for picture analysis.

FIGS. 2A to 2D are views illustrating various score forms existing in sports videos. As noted from FIGS. 2A to 2D, during reproduction by the mobile terminal, it is necessary to automatically extract a score region and then enlage and reproduce the extracted score region.

The score region is located at a left upper portion of a screen during the display of a soccer game, and is displayed usually in a square shape having a boundary line mainly having a predetermined brightness. Also, the score region is not a natural picture but is a graphic, and is nearly always located at the same position within the screen picture. To describe in more detail, when a screen picture is a closeup shot, an environment around the score region on the screen picture is often in a static state. In this case, it is possible to extract a more accurate score region.

As a result of observing videos of various soccer games, most score regions of the videos are located within an area having dimensions of one half of the entire horizontal length and one third of the entire vertical length from a starting point of the screen. Accordingly, by limiting the range of search to this area, it is possible to efficiently extract the score region.

Meanwhile, even though there have been some researches on an advertising board region, studies on the extraction of a score region have not been actively made. As noted from "Okihisa Utsumi, K. Miura, I. Ide, S. Sakai, and H. Tanaka, "An Object Detection Method for Describing Soccer Games from Video," in Proc. Multimedia and Expo, vol. 1, Aug. 2002, pp. 45-48," Okihisa et al. discloses technology for discrminating a caption region from a sports ground region by using edge information. However, by the Okihisa et al.'s technology, it is not easy to discriminate a score region from an advertising board within a caption region. Also, as noted from "Ho-Sub Yoon, Young-Lae J. Bae, and Young-Kyu Yang, "A Soccer Image Sequence Mosaicking and Analysis Method Using Line and Advertisement Board Detection," ETRI Journal, vol. 24, Dec. 2002, pp. 443-454," Yoon et al. discloses technology for distinguishing an advertising board region from a sports ground region by using the fact that a difference exists between brightness changes in a horizontal direction of an advertising board and a sports ground. However, since there exists advertising boards having various designs and score regions having various designs, it is not easy to discriminate between the score region and the advertising board by using only the brightness difference between them. Therefore, it is desirable to extract a score region from a screen picture by using only the characteristics of the score region.

DISCLOSURE

Technical Problem

Accordingly, the present invention has been made to solve the above-mentioned problems occuring in the prior art., and it is an object of the present invention to provide a method for automatically extracting a region a user is most interested in or pays more attention to than other regions on a screen of a multimedia mobile terminal.

Also, it is an object of the present invention to provide a method for extracting a region-of-interest of a user in a multimedia mobile terminal, which enlarges the extracted region-of-interest and then displays the enlarged region-of-interest, so that the user can easily view and recognize the extracted region-of-interest even on a small screen, whenever the user desires to view the region-of-interest.

Technical Solution

In accordance with an aspect of the present invention for achieving the above objects, there is provided a method for extracting a region-of-interest of a user in a multimedia mobile terminal, the method including the steps of: setting a search region in an input picture input to the multimedia mobile terminal on a screen picture-to-screen picture basis, and extracting a group of boundary of a region-of-interest based on a brightness difference between the set search region and an environment around the set search region; determining boundary coordinates of the region-of-interest through learning during a predetermined frame among the extracted group of boundary coordinate candidates; and enlarging the regionof-interest having the determined boundary coordinates, and displaying the enlarged region-of-interest.

Advantageous Effects

According to the present invention as configured above, a region a user is most interested in or pays more attention to than other regions on a screen is automatically extracted, and the extracted region-of-interest is enlarged and then the enlarged region-of-interest is displayed, whenever the user desires to view the region-of-interest. Accordingly, it is possible for users to view pictures in such an efficient manner as to provide the users with an even better experience and understanding during viewing.

DESCRIPTION OF DRAWINGS

The above and other features, aspects, and advantages of the present invention will be more apparent from the following detailed description taken in conjunction with the accompanying drawings, in which:

FIG. 7 are views illustrating a comparison between an actual score region and an extracted score region in each sports video according to an embodiment of the present invention.

BEST MODE

Mode for Invention

Hereinafter, exemplary embodiments of the present invention will be described in detail with reference to the accompanying drawings. In the following description of the present invention, a detailed description of known functions and configurations incorporated herein will be omitted when it may make the subject matter of the present invention rather unclear. Meanwhile, in the following embodiments, a process for displaying a soccer game video among sports videos will be described as an example.

First, a region-of-interest has a boundary line having a predetermined brightness, and includes, therein, the characters which express a score or time, so that brightness differences among pixels close to one another significantly change, differently from a natural picture corresponding to one form of a Markov source. Accordingly, a location at which the sum of brightness differences become larger than a predetermined threshold value can be recognized as the boundary line of the region-of-interest.

Figure 1:
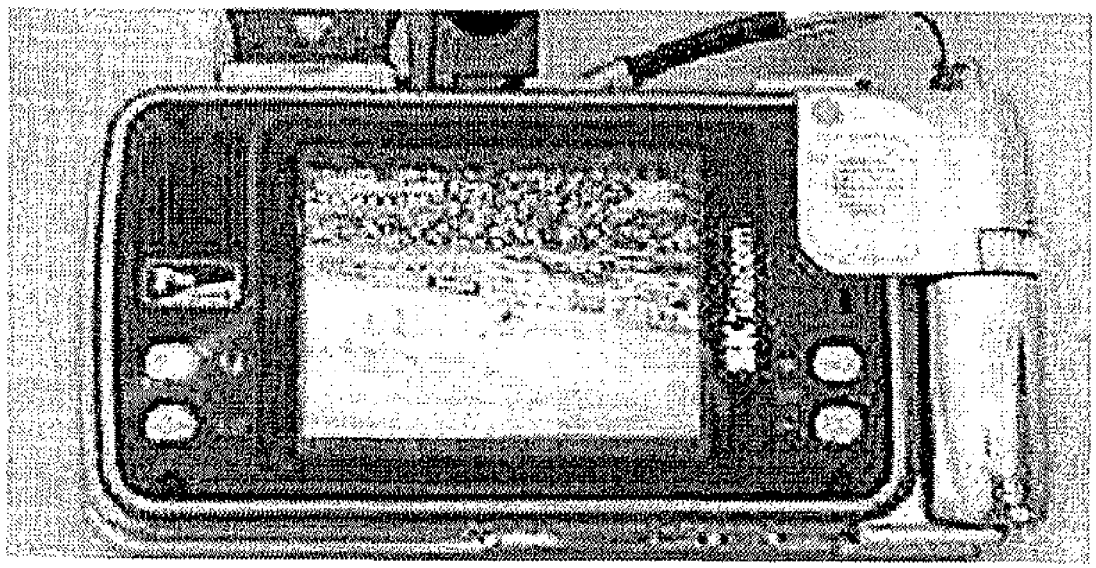
FIG. 1 is a view illustrating a DMB phone in which a broadcasted sport is displayed.
Figure 2A:
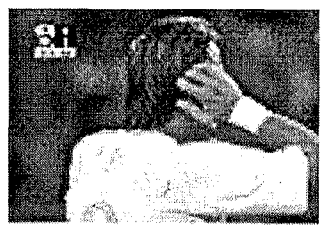
FIG. 2 are views illustrating various score forms existing in sports videos.
Figure 2B:
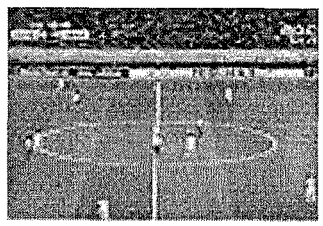
Figure 2C:
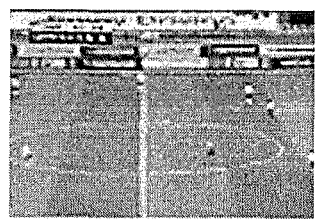
Figure 2D:
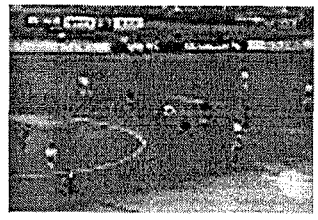
Figure 3:
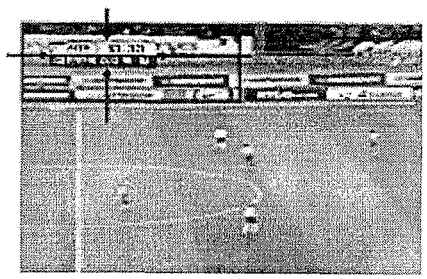
FIG. 3 is a view illustrating a soccer game video among sports videos according to an embodiment of the present invention.
Figure 4:
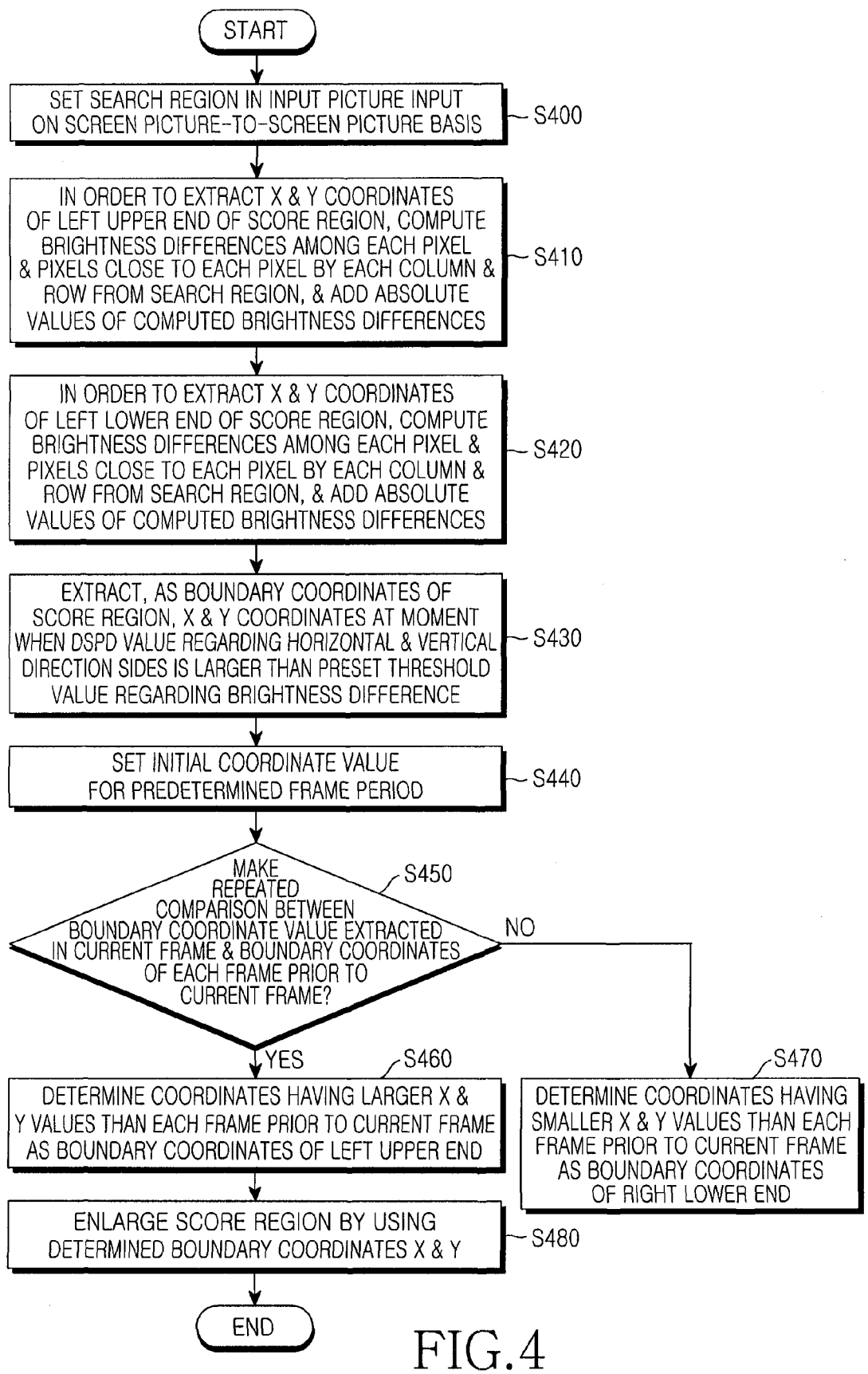
FIG. 4 is a flowchart showing a method for extracting a score region in a sports video according to an embodiment of the present invention.

FIG. 3 is a view illustrating a soccer game video among sports videos according to an embodiment of the present invention, and FIG. 4 is a flowchart showing a method for extracting a score region in a sports video according to an embodiment of the present invention.

In an input picture as illustrated in FIG. 3, which is input on a screen picture-to-screen picture basis, the inside of a squre defined by a bold line is set as a search region (S400), and arrow directions represent directions required to compute a Sum of Pixel Differences (SPD) in regard to each side of the search region.

As illustrated in FIG. 4, in order to extract an x coordinate of a left upper end of the score region, first, brightness differences between each pixel and pixels close to each pixel are computed for each column to the right from a left boundary of the search region, absolute values of the computed brightness differences are calculated, and then the calculated absolute values are added. Also, in order to extract a y coordinate of a left upper end of the score region, brightness differences among each pixel and pixels close to each pixel are computed for each row downward from an upper boundary of the search region, absolute values of the computed brightness differences are calculated, and then the calculated absolute values are added (S410).

The process as described above is performed to the left from a right boundary of the search region in order to extract an x coordinate of a right lower end of the score region, and upward from a lower boundary of the search region in order to extract a y coordinate of a right lower end of the score region (S420). Namely, SPDs for a horizontal side and a vertical side are defined by equation (1) below.

$$SPD_v(y) = \sum_{x=0}^{width/2} |f(x, y) - f(x+1, y)| \left(0 \le y < \frac{height}{3}\right)$$

$$SPD_h(x) = \sum_{y=0}^{height/3} |f(x, y) - f(x, y+1)| \left(0 \le x < \frac{width}{2}\right)$$

In equation (1), x and y represent horizontal and vertical coordinates within the search region, and f(x, y) represents a brightness in (x, y) coordinates. By using an SPD, a location at which an SPD value becomes larger than a threshold value regarding a brightness difference can be recognized as a boundary of the score region. However, since the SPD value varies depending on each picture, the threshold value is not easy to set. Accordingly, it is necessary to use an amount of change of the SPD value.

The amount of change in the SPD value can be perceived based on a difference of the SPD value computed by each row (or column) by using equation (1), and a location at which the difference of the SPD value becomes larger than a set threshold value can be recognized as the boundary of the score region. Namely, a Difference of SPD (DSPD) regarding horizontal and vertical sides is defined by equation (2) below.

$$DSPD_v(y) = |SPD_v(y) - SPD_v(y+1)| \left(0 \le y < \frac{height}{3}\right)$$

$$DSPD_h(x) = |SPD_h(x) - SPD_h(x+1)| \left(0 \le x < \frac{width}{2}\right)$$

In order to extract a score region in a squre shape, coordinates of a left upper end and coordinates of a right lower end in the score region are required. Accordingly, the method as above is applied to four sides of the score region (x, y) coordinates of a location at which a DSPDv and a DSPDh become larger than a predetermined threshold value are extracted as coordinates of the boundary of the score region (S430).

Figure 5:
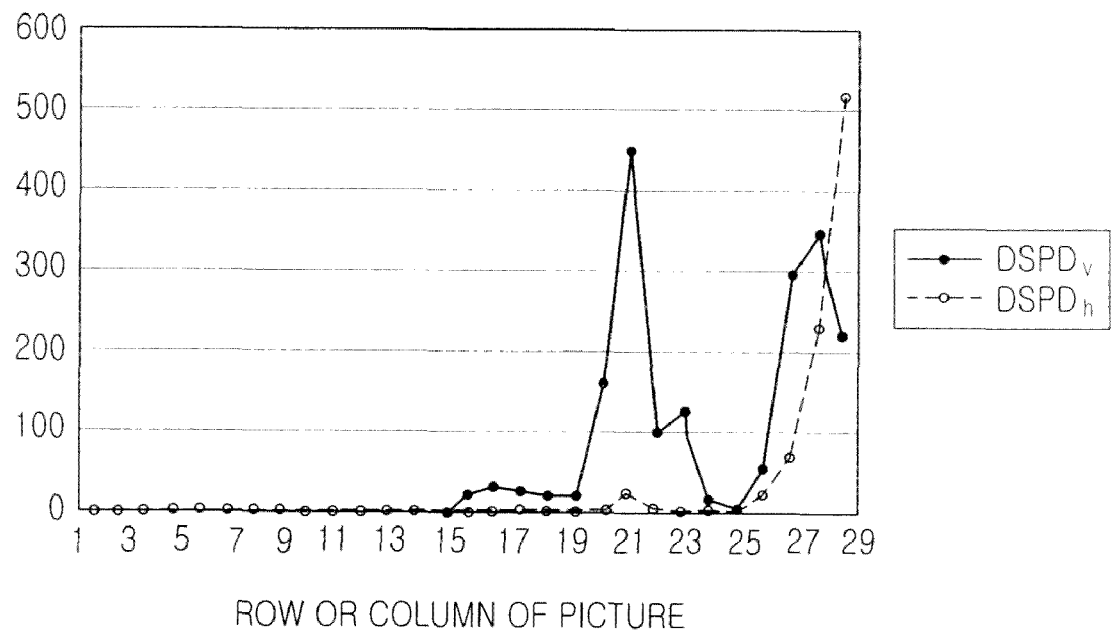
FIG. 5 is a graph illustrating changes in a Difference of the Sum of Pixel Differences regarding each side in horizontal and vertical directions of the search region (a DSPDv and a DSPDh) for extracting x and y coordinates of a left upper end in regard to FIG. 2.

FIG. 5 is a graph illustrating changes in a DSPDv and a DSPDh for extracting x and y coordinates of a left upper end in regard to FIG. 2.

In the present invention, "200" is used as a threshold value in regard to all pictures. However, an adequate value can be selected among values in a range of (200, 300) depending on each picture.

In FIG. 5, it is possible to perceive a location at which DSPDv and DSPDh values become larger than a set threshold value. It is noted from FIG. 5 that x and y coordinates of the horizontal and vertical directions are determined as (29, 21) for a threshold value of 200.

Hence, coordinates of a left upper end for extracting the score region become (29, 21). Coordinates of a right lower end are extracted in the same manner as above.

Meanwhile, since it is usual that an environment around the score region in a soccer game changes dynamically, it is very hard to determine an accurate score region by using only one frame. This is because, due to the existence of advertising boards or stands for the spectators around the score region, the extracted region including the advertising boards or stands for the spectators is lager than an actual score region.

Usually, the score region is included in the extracted region. Therefore, in order to determine an optimal score region, coordinates having maximum x and y values are necessary among candidates extracted for boundary coordinates of the left upper end of the score region for a predetermined learning period, and coordinates having minimum x and y values are necessary among candidates extracted for boundary coordinates of the right lower end of the score region for the predetermined learning period. Hence, boundary coordinates satisfying the conditions as above are determined through learning for a predetermined frame period.

After setting an initial coordinate value for comparison during a predetermined frame period (S440), a step for comparing boundary coordinates computed in a current frame with boundary coordinates up to the previous frame is repeated (S450).

Since maximum x and y are necessary for coordinates of the left upper end of the score region, coordinates having larger x and y values are stored. Since minimum x and y are necessary for coordinates of the right lower end of the score region, coordinates having smaller x and y values are stored. To this end, a basic algorithm is as follows:

```
i: frame number
learning_period: 100 frames
temp_max_x = temp_max_y = -1;
temp_min_x = temp_min_y = 1000;
for(i = 0; i < learning_period; i++)
    if(temp_max_x < top_left_x(i))
        temp_max_x = top_left_x(i);
    if(temp_max_y < top_left_y(i))
        temp_max_y = top_left_y(i);
    if(temp_min_x > bottom_right_x(i))
        temp_min_x = bottom_right_x(i);
    if(temp_min_y > bottom_right_y(i))
        temp_min_y = bottom_right_y(i);.
```

Initial coordinate values of a $temp_{max}$ and a $temp_{min}$ are set to -1 and 1000, respectively. The value "-i" represents coordinates extracted in a current frame. Also, "100" frames are used as a learning period. For a period of "100" frames, coordinate values of a left upper end and a right lower end extracted in the current frame are compared with coordinate values of a $temp_{max}$ and a $temp_{min}$, thereby determining a final boundary coordinate value. Namely, for coordinates of the left upper end of the score region, coordinates having larger x and y values than boundary coordinate values of the previous frame are determined (S460). For coordinates of the right lower end of the score region, coordinates having smaller x and y values than the boundary coordinate values of the previous frame are determined (S470).

When the learning is completed, a process for extracting coordinates is no longer performed, and by using optimal boundary coordinates x and y stored in the $temp_{max}$ and $temp_{min}$, the extracted score region is enlarged (S480).

Figure 6:
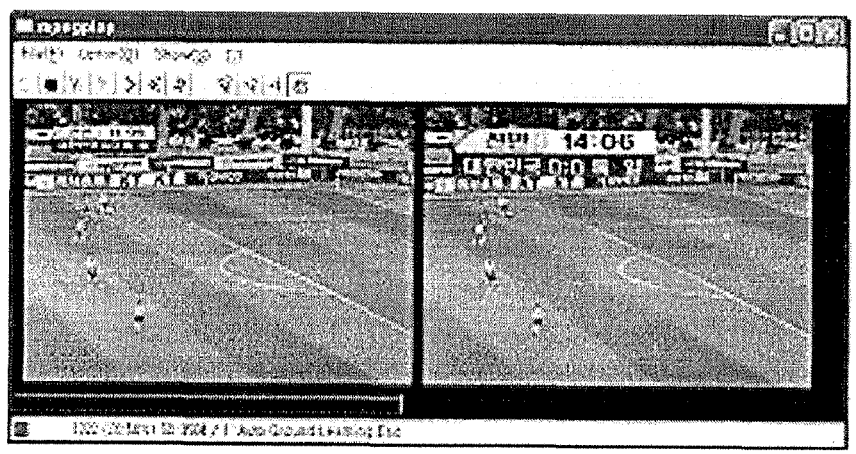
FIG. 6 is a view illustrating an enlarged score region after extracting the score region in the sports video according to an embodiment of the present invention.

FIG. 6 is a view illustrating an enlarged score region after extracting the score region in the sports video according to an embodiment of the present invention.

As illustrated in FIG. 6, in order for the user to easily view and recognize the optimal score region determined as above even on a small screen of a mobile terminal, the optimal score region is enlarged to twice as large as its original size by using bilinear interpolation.

In order to display the score region even in each frame having no score frame, a score region displayed several frames before is stored. In the present invention, the score region of a closeup shot [1] frame having a static environment around the score region is stored. When a brightness difference between the stored score region and a region extracted by using optimal boundary coordinates determined through the algorithm as above is larger than a set threshold value, it is determined that there is no score region in a current frame, and the stored score region is then displayed.

The present invention as described above has been developed by using Visual Studio 2003 (C++) in a Win32 environment, and uses the FFMpeg library for MPEG decoding. In an experiment of the present invention, a soccer game picture having a playback time of 5 minutes has been encoded and used in an MPEG-1 format of 352×240 and 29.97 fps. All processes have been performed in real-time by a Pentium-4 3.00 GHz PC.

Also, in an experiment of the present invention, in order to measure an accuracy of the extraction of the score region, a Recall and a Precision defined by equation (3) below are used.

Recall=(the number of pixels belonging to an actual score region among extracted score regions)/(the number of pixels belonging to an actual region)× 100% and Precision=(the number of pixels belonging to an actual score region among extracted score regions)/(the number of all pixels belonging to an extracted region)×100%. (3)

Irrespective of the accuracy, if the extracted score region is larger than the actual score region, a Recall value becomes large, and if the extracted score region is smaller than the actual score region, a Precision value becomes large. Accordingly, the Recall and Precision must be simultaneously considered.

FIG. 7 is a view illustrating comparison between an actual score region and an extracted score region in each sports video according to an embodiment of the present invention.

Referring to FIG. 7, a Recall and a Precision are computed by using four soccer game videos, and actual score regions (the left: from the top to the bottom, pictures 1, 2, 3, and 4) and score regions (the right) extracted by the algorithm of the present invention are shown in detail. Also, Table 1 below shows the number of pixels equivalent to each region, and Table 2 below shows a result of measurement of a Recall and a Precision.

TABLE 1

|  | Actual Score Region | Extracted Score Region | actual score region among extracted regions |
|---|---|---|---|
| Picture 1 | 1501 | 1509 | 1263 |
| Picture 2 | 1788 | 1610 | 1610 |
| Picture 3 | 2232 | 2232 | 2232 |
| Picture 4 | 1678 | 866 | 866 |

TABLE 2

|  | Recall [%] | Precision [%] |
|---|---|---|
| Picture 1 | 84.14 | 83.69 |
| Picture 2 | 90.04 | 100 |
| Picture 3 | 100 | 100 |
| Picture 4 | 51.61 | 100 |

Also, the present invention has been developed for the use of a Personal Digital Assistant (PDA) for application to an actual mobile device. The present invention has been developed by using Microsoft Embedded Visual Studio 4.0, and HP iPAQ hx4700 has been used for an experiment of the present invention. For performance measurement, two soccer game videos (the Republic of Korea vs. Germany: 2004 Friendly Soccer Game and Italy vs. Japan: 2004 Athens Olympic Soccer Game), each of which has the h.264 format and a playback time of 2 minutes, have been used. The results of performance measurement using equation (1) in regard to the two pictures to which an algorithm proposed in the present invention is applied are summarized in Table 3.

TABLE 3

|  | Republic of Korea vs. Germany | Italy vs. Japan |
|---|---|---|
| average playback speed without extraction of score box | 31.045 frames/sec | 30.166 frames/sec |
| average playback speed with extraction of score box | 29.251 frames/sec | 28.667 frames/sec |
| Time Increase Rate [%] | 5.78 | 4.97 |

In order to achieve easy viewing of the score region even on a small screen of the mobile terminal, the present invention proposes a system which extracts the score region, enlarges the extracted score region, and then displays the enlarged score region. In a PDA, pictures are reproduced at a speed of about 29 frames/sec on the entire display, and it is possible to perform on/off of the extraction function according to the user's taste.

It is expected that the system as above can be aplied to the extraction of a region-of-interest of each of various sports, a headline box of news, etc., besides soccer games.

INDUSTRIAL APPLICABILITY

As described above, a method for extracting a region-of-interest of a user in a multimedia mobile terminal according to an embodiment of the present invention can be implemented. Meanwhile, while the invention has been shown and described with reference to certain exemplary embodiments thereof, it will be understood by those skilled in the art that various changes in form and details may be made therein without departing from the spirit and scope of the invention. Therefore, the spirit and scope of the present invention must be defined not by described embodiments thereof but by the appended claims and equivalents of the appended claims.

The invention claimed is:

1. A method for extracting a region-of-interest of a user in a multimedia mobile terminal, the method comprising the steps of:

setting a search region in an input picture input to the multimedia mobile terminal on a screen picture-to-screen picture basis, and extracting a group of boundary coordinate candidates of a region-of-interest based on a brightness difference between the set search region and an environment around the set search region;

determining, from the extracted group of boundary coordinate candidates, boundary coordinates of the region-of-interest through learning during a predetermined number of frames; and enlarging the region-of-interest having the determined boundary coordinates, and displaying the enlarged region-of-interest.

2. The method as claimed in claim 1, wherein the step of extracting group of boundary of a region-of-interest comprises the sub-steps of:

computing first brightness differences among each pixel and pixels close to each pixel by each column and row so as to extract x and y coordinates of a left upper end of the search region, and adding absolute values of the computed first brightness differences;

computing second brightness differences among each pixel and pixels close to each pixel by each column and row so as to extract x and y coordinates of a right lower end of the search region, and adding absolute values of the computed second brightness differences; and extracting, as the boundary of the region-of-interest, x and y coordinates at a moment when a difference of the added absolute values of the computed first and second brightness differences (i.e., a Difference of the Sum of Pixel Differences (DSPD)) is larger than a threshold value set regarding brightness difference.

3. The method as claimed in claim 2, wherein DSPD values for horizontal and vertical sides of the search region is computed by equations defined by $$DSPD_v(y) = |SPD_v(y) - SPD_v(y+1)| \left( 0 \le y < \frac{\text{height}}{3} \right)$$

$$DSPD_h(x) = |SPD_h(x) - SPD_h(x+1)| \left( 0 \le x < \frac{\text{width}}{2} \right).$$

4. The method as claimed in claim 2, wherein, in the step of extracting, an accuracy of the extraction of the region-of-interest is measured by equations defined by Recall=(the number of pixels belonging to an actual score region among extracted score regions)/(the number of pixels belonging to an actual region)× 100% and Precision=(the number of pixels belonging to an actual score region among extracted score regions)/(the number of all pixels belonging to an extracted region)×100%.

5. The method as claimed in claim 1, wherein the step of determining boundary coordinates of the region-of-interest comprises the sub-steps of:

comparing boundary coordinates of a region-of-interest extracted from a current frame with boundary coordinates of a previous frame during a predetermined frame period;

determining a coordinate value of a left upper end of the region-of-interest to be a coordinate value having larger x and y values than x and y values of the boundary coordinates of the previous frame; and determining a coordinate value of a right lower end of the region-of-interest to be a coordinate value having smaller x and y values than x and y values of the boundary coordinates of the previous frame.

6. The method as claimed in claim 1, wherein the step of displaying the enlarged region-of-interest comprises a step of, if boundary coordinates of a region-of-interest previously displayed and stored is larger than a threshold value set regarding a brightness the stored region-of-interest.

7. The method as claimed in claim 1, wherein the learning comprises comparing the extracted group of boundary coordinate candidates for each frame in the predetermined number of frames.

\* \* \* \* \*